Figure 1:
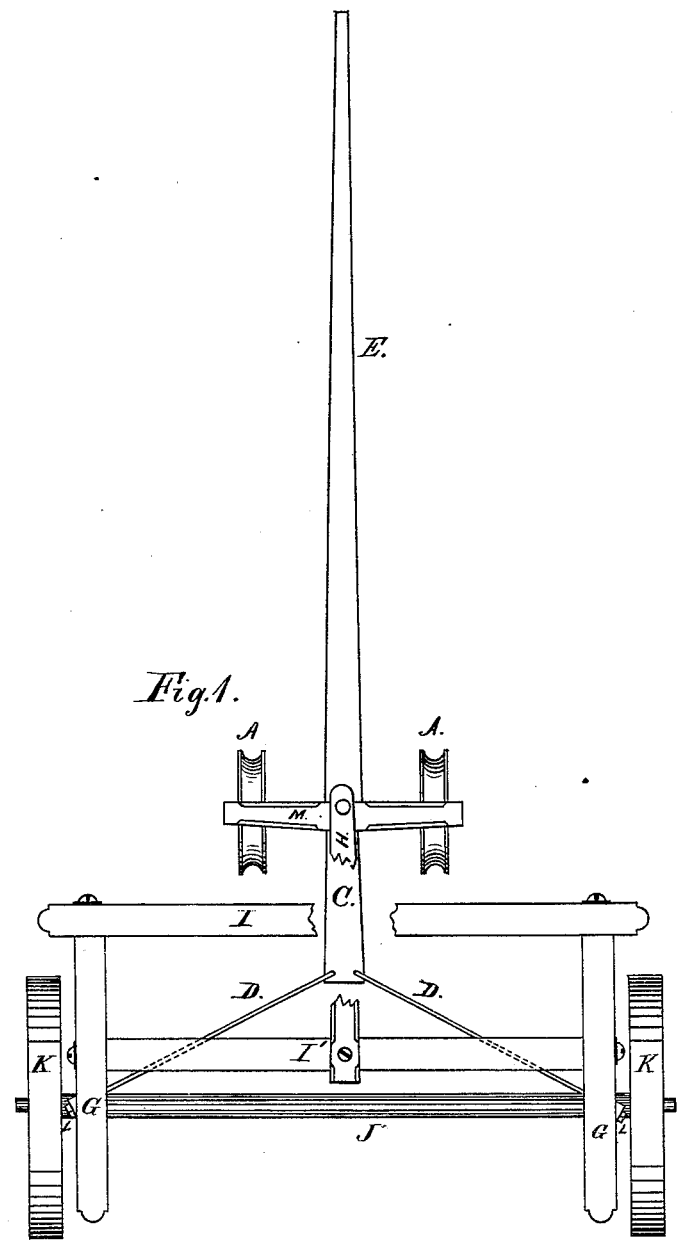

(Model.)

2 Sheets—Sheet 1.

R. CHESNUT.
Grain Drill.

No. 241,786.  Patented May 24, 1881.

Witnesses.
Addison H. Study.
Charles Bond

Inventor.
Robert Chesnut
By F. B. Hunt
Atty (Model.)
2 Sheets—Sheet 2.
R. CHESNUT.
Grain Drill.
No. 241,786. Patented May 24, 1881.
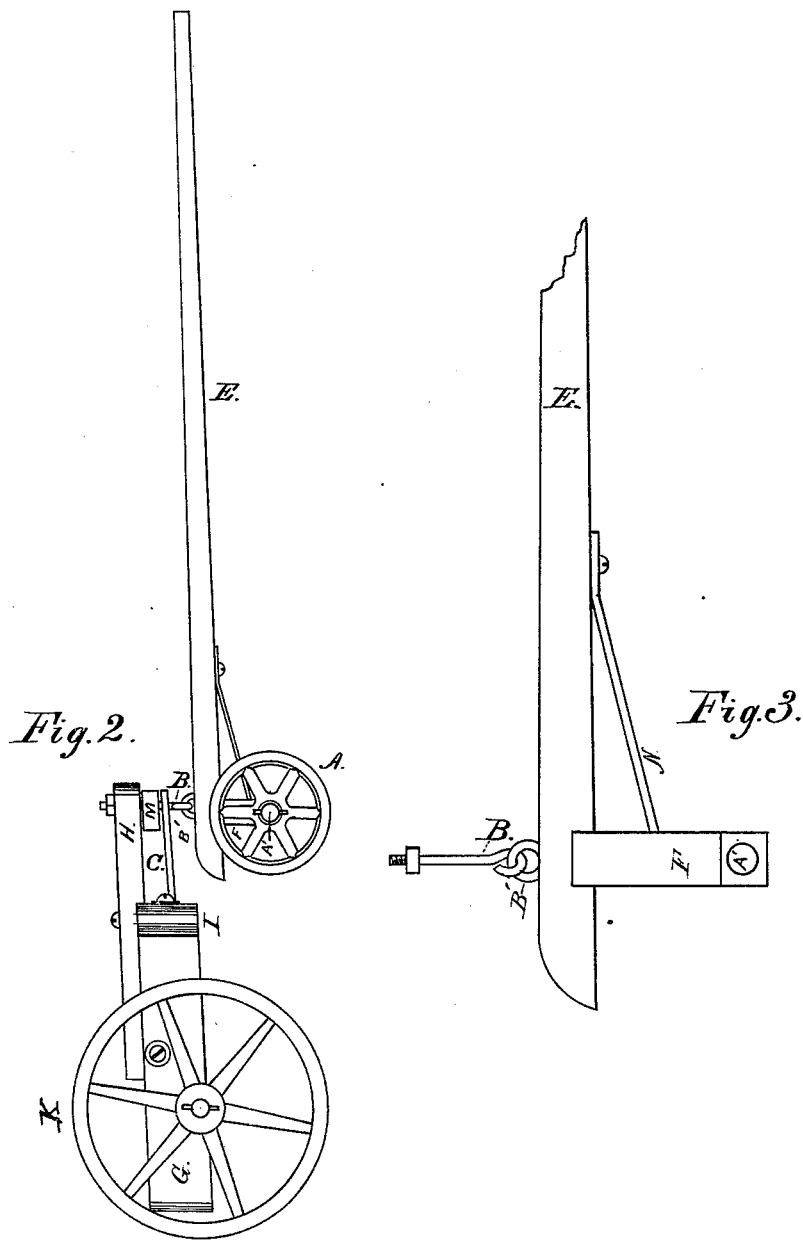

United States Patent Office.

ROBERT CHESNUT, OF RICHMOND, INDIANA, ASSIGNOR OF ONE-HALF TO THOMAS ATKINSON, OF SAME PLACE.

GRAIN-DRILL.

SPECIFICATION forming part of Letters Patent No. 241,786, dated May 24, 1881.

Application filed January 15, 1881. (Model.)

*To all whom it may concern:*

Be it known that I, ROBERT CHESNUT, of Richmond, in the county of Wayne and State of Indiana, have invented certain Improvements in Grain-Drills, of which the following is a specification.

My invention relates to grain-drills; and the invention consists in providing the frame with a separate truck-frame and a novel arrangement of the draw-bar and brace-rods, all as hereinafter more fully set forth.

Figure 1 is a top or plan view. Fig. 2 is a side elevation. Fig. 3 is a side elevation of the truck with the wheels removed, and showing the eyebolts by means of which the truck is connected to the frame of the drill.

A A are the wheels of the truck, attached to the spindle A' of the axle F.

The bar H is secured to the cross-bars I I' of the frame or side rails, G, in the manner of fastening the tongue to grain-drills as at present in use.

J is the main axle of the drill, upon which the main wheels K K are placed.

The draft-bar C passes through a mortise in the front rail of the frame I, and has attached to its rear end the draft-rods D D. The rear ends of these rods pass obliquely through the side rails, G, and are provided with washers and nuts L L for regulating the tension and equalizing the strain upon the frame. The draft-bar C and the bar H extend forward from the main frame of the machine a sufficient distance to place the truck in proper position, and are attached to the truck by means of the eyebolt B passing through their front ends, as seen in Fig. 2. The eyebolt B passes through and forms the pivot for the doubletree M. The eyebolt B' connects with the eyebolt B and passes downward through the rear end of the tongue E, the axle F, and the rear end of the stay-rod N.

The wheels A of the truck are grooved, as seen in Fig. 1, to cause them to take hold on the ground and resist side pressure.

The washers and nuts L may be replaced with any equivalent device; or the tension or adjustment may be made at the ends of the draft-rods, which are attached to the draft-bar C.

In all ordinary grain-drills now in use there is a great defect by reason of the downward pressure of the tongue upon the necks of the team, and also from the sudden lurching from side to side as the teeth or hoes may encounter an obstruction aside from the center of draft.

In my invention the grooved wheels of the truck greatly counteract the tendency to side motion, while the truck is attached to the main frame by means of the eyebolts, thus allowing the truck and the main frame of the drill to adjust themselves to any inequality of surface irrespective of each other.

I am aware that gang-plows and potato-diggers have been provided with front and rear wheels, and that a grain-drill has been patented which shows a single central wheel arranged to be adjusted vertically by means of a lever for tightening or loosening the belts which operate the feed-rollers; and I am also aware that farm-trucks have been patented for attachment to plows, drags, and similar implements, and therefore I do not claim these; but, Having fully described my invention, what I claim is—

In combination with the main frame G, provided with the draft-bar C and rods D D, the front truck connected thereto by the eyebolts B and B', the whole being arranged to operate substantially as shown and described.

ROBERT CHESNUT.

Witnesses:
W. F. CHESNUT,
GEO. H. EGGEMEYER.